United States Patent Office 3,505,450
Patented Apr. 7, 1970

3,505,450
METHOD OF TREATING COCCIDIOSIS IN POULTRY WITH 6-CHLOROPURINE AND A TETRACYCLINE ANTIBIOTIC
Max W. Miller, North Stonington, and Harold L. Howes, Jr., Groton, Conn., assignors to Chas. Pfizer & Co., Inc., New York, N.Y., a corporation of Delaware
No Drawing. Filed Apr. 15, 1966, Ser. No. 542,741
Int. Cl. A61k 21/00, 27/00
U.S. Cl. 424—227
5 Claims

ABSTRACT OF THE DISCLOSURE

Poultry feed compositions useful in combatting coccidiosis and based on 6-chloropurine or 6-chloropurine and a tetracycline antibiotic as the active coccidiostat and method of combatting coccidiosis by administering said compositions to poultry.

---

This invention relates to a method of combatting coccidiosis in poultry and to poultry feed compositions useful therefor.

Coccidiosis is a disease caused by a parasitic protozoan of the genus Eimeria, for example, E. tenella. The protozoan in the parasitic stage of the life cycle infests the intestinal tract of the host animals. Since the disease causes severe and frequently fatal infection in poultry flocks, it constitutes a serious economic hazard.

It has now been found that poultry feed compositions containing 6-chloropurine or a mixture of 6-chloropurine and a tetracycline antibiotic as principal ingredient are effective in combatting coccidiosis due to various species of Eimeria. Furthermore, in addition to the aforesaid coccidiostatic action, such feed compositions exhibit a growth promoting effect resulting in poultry having a weight gain increase. Accordingly, the present invention relates to poultry feed compositions effective in the control and prevention of coccidiosis which contains as principal ingredient a small but effective amount of 6-chloropurine or a mixture of 6-chloropurine and a tetracycline antibiotic.

While it was found that 6-chloropurine alone is an effective coccidiostat, it was further discovered that its combination with a tetracycline antibiotic for the same purpose provided a highly desirable, unexpected additive effect with profound advantages. For instance, while it is possible to obtain suitable coccidiostat effects and weight gains with large amounts of certain tetracycline antibiotics, equivalent or better results can be accomplished with lesser amounts of tetracycline antibiotics when 6-chloropurine is included. This additive effect is particularly advantageous in that, on a cost basis, it allows one to substitute much less-expensive 6-chloropurine for tetracycline antibiotic without adversely affecting the resulting benefits. Further, regulations restricting the amounts of a tetracycline antibiotic ino an animal feed can be fully met while still providing a composition with enhanced anti-coccidial action.

6-chloropurine alone in poultry feed is found to be effective at levels from about 0.0125% to about 0.2% by weight of the feed composition. However, it is generally preferred at concentrations of about 0.1% by weight where it substantially maintains poultry free from infection and permits normal weight gains.

As for the combinations of 6-chloropurine and tetracycline antibiotic, it is found that compositions containing from about 0.006% to about 0.4% by weight of 6-chloropurine and from about 0.02% to about 0.04% by weight of a tetracycline antibiotic are effective. However, compositions containing 6-chloropurine and a tetracycline antibiotic in which said components are present in amounts to provide 0.04% and 0.02% by weight, respectively, are most preferred. The ability of the above said combinations in combatting coccidiosis in poultry resides in the unexpected additive phenomenon discussed earlier. Such a co-action or additive phenomenon might be explained by the complementary nature of two different modes of action associated with each component. Experimentally, this complementary action is observed. By adding a tetracycline antibiotic to 6-chloropurine, weight levels of 6-chloropurine in the range from 0.0125% to 0.1% completely cleared infected chicks of E. tenella infection with normal weight gains and no mortality. Since the effect is of an additive nature, it permits the formulation of feeds containing minimal amounts of 6-chloropurine and a tetracycline antibiotic which are equivalent or better than feeds containing equivalent amounts of 6-chloropurine or tetracycline antibiotic alone. As a result, one can prepare a feed composition containing a greater amount of coccidiostats than would be desirable for a one component system while providing more effective anticoccidial action with a growth stimulating effect as well. For example, although it might be inadvisable to formulate a feed composition containing 0.06% of tetracycline, it would be practical and desirable to formulate a feed composition containing 0.04% 6-chloropurine and 0.02% tetracycline antibiotic.

By the term "tetracycline antibiotic" as used herein, the following tetracyclines are contemplated: oxytetracycline, tetracycline, 7-chlortetracycline, 6-methylene-5-oxytetracycline, and 6α-methyl-6-deoxytetracycline.

In this connection, it should be understood that the term "tetracycline antibiotic" includes not only the parent compound but also the pharmaceutically-acceptable addition salts as well. Of course, such derivatives must be non-toxic.

The compositions of this invention can be prepared by intimately dispersing the active or principal ingredients throughout a carrier or diluent which is either solid or liquid. Preferably, the component or components are thoroughly admixed with a major proportion of poultry feed supplied to the fowl.

For experimental purposes a basal ration having the following composition was used:

Riboflavin supplement
D activated animal sterol
Vitamin A supplement
Meat and bone meal
Fish meal
Condensed fermented corn
  extractives Soybean meal
Corn gluten meal
Corn gluten feed
Dehydrated alfalfa meal
Corn meal
Hominy feed
Wheat middlings
Dicalcium phosphate
Calcium carbonate
Manganese sulfate
Salt
Calcium pantothenate
Niacin
Choline chloride
Vitamin $B_{12}$ supplement
Vitamin E supplement
Menadione sodium bisulfite
Animal fat preserved with BHA
Ethoxyquin (a preservative)

EXAMPLE

In the screening program to determine the effectiveness of the herein disclosed compounds as coccidiostats, *Eimeria tenella* is used as the test organism, since said organism is probably the most widely occurring species. The method of evaluation consists of treating young chicks with a standard basal feed containing various percent by weight of feed concentrations of 6-chloropurine and mixtures thereof with a tetracycline antibiotic. Medication begins on day 1 and continues until day 9 when the animals are sacrificed and examined for evidence of infection. On day 2, the birds are infected with 200,000 sporulated oocysts of *E. tenella* via oral inoculation.

The efficacy of the drug is judged by its ability to prevent mortality and by comparison of the pathologic index with that of unmedicated or infected controls. Weight gains are compared with those of infected and uninfected controls. At necropsy, the degree of pathologic involvement is expressed as the average degree of infection (A.D.I.) based on the following scheme:

0—no lesions in the cecum
1—slight lesion formation in the cecum
2—moderate lesion formation in the cecum
3—severe lesion formation in the cecum
4—death due to infection The following test results are obtained by the application of the aforedescribed drug-diet method:

TABLE I.—ANTICOCCIDIAL ACTIVITY OF 6-CHLOROPURINE IN *E. TENELLA* INFECTED CHICKS

| Percent by weight of 6-chloropurine | Experiment | | | | | | Average | |
|---|---|---|---|---|---|---|---|---|
| | Percent WG [1] | ADI | Percent WG [2] | ADI | Percent WG [3] | ADI | Percent Wt. Gain | ADI |
| 0.2 | 74 | 0.0 | 89 | 0.0 | | | 81 | 0.0 |
| 0.1 | 98 | 0.0 | 83 | 0.0 | | | 91 | 0.0 |
| 0.05 | 85 | 1.6 | 69 | 1.2 | 74 | 0.5 | 76 | 1.1 |
| 0.025 | 65 | 2.8 | 63 | 2.0 | 59 | 2.4 | 62 | 2.4 |
| 0.0125 | | | 61 | 2.8 | 35 | 3.0 | 48 | 2.9 |
| Infected control | 49 | 3.4 | 20 | 3.4 | 20 | 3.1 | 30 | 3.3 |

TABLE II.—ANTICOCCIDIAL ACTIVITY OF 6-CHLOROPURINE IN COMBINATION WITH OXYTETRACYCLINE IN *E. TENELLA* INFECTED CHICKS

| Percent by weight of 6-chloropurine | Percent by wt. of oxytetracycline | Experiment | | | | | | Average | |
|---|---|---|---|---|---|---|---|---|---|
| | | Percent WG [1] | ADI | Percent WG [2] | ADI | Percent WG [3] | AQI | Percent WG | ADI |
| 0.05 | 0.04 | 120 | 0.0 | | | 103 | 0.3 | 112 | 0.2 |
| 0.025 | 0.04 | 99 | 0.0 | 114 | 0.3 | 94 | 1.6 | 102 | 0.6 |
| 0.0125 | 0.04 | 106 | 0.0 | 89 | 1.6 | 69 | 2.1 | 88 | 1.2 |
| 0.006 | 0.04 | | | 88 | 2.0 | 57 | 2.5 | 73 | 2.3 |
| 0.05 | 0.02 | 110 | 0.0 | | | 86 | 0.5 | 100 | 0.2 |
| 0.025 | 0.02 | 126 | 0.6 | 97 | 1.6 | 52 | 2.2 | 88 | 1.6 |
| 0.0125 | 0.02 | 95 | 0.8 | 76 | 2.4 | 77 | 2.8 | 78 | 2.2 |
| 0.006 | 0.02 | | | 61 | 2.6 | 54 | 3.2 | 57 | 2.9 |

TABLE III.—ANTICOCCIDIAL ACTIVITY OF MIXTURES CONTAINING 6-CHLOROPURINE AND VARIOUS TETRACYCLINE ANTIBIOTICS IN *E. TENELLA* INFECTED CHICKS

| Tetracycline antibiotic | Percent by weight of 6-chloropurine | Percent by weight of tetracycline antibiotic | Percent Wt. gain (WG) | Toxicity | ADI |
|---|---|---|---|---|---|
| 7-chlorotetracycline | 0.025 | 0.012 | 84 | | 2.4 |
| | 0.025 | 0.006 | 67 | | 2.2 |
| 6-demethyl-6-deoxy-tetracycline | 0.025 | 0.012 | 84 | | 2.5 |
| | 0.025 | 0.006 | 77 | | 2.4 |
| 6-methylene-5-oxytetracycline | 0.025 | 0.025 | 96 | | 1.4 |
| | 0.025 | 0.012 | 71 | | 2.3 |
| 6-α-methyl-6-deoxy-tetracycline | 0.025 | 0.012 | 100.5 | | 0.8 |
| | 0.025 | 0.006 | 93 | | 1.1 |
| Tetracycline | 0.025 | 0.002 | 88 | | 1.6 |
| Infected control | | | 22 | | 3.5 |

The above data illustrated by the experimental material in Tables I, II and III clearly indicate the effective anti-coccidial activity of 6-chloropurine, and mixtures containing 6-chloropurine and various tetracycline antibiotics. Furthermore, in each instance, the degree of pathologic involvement is small and the percent weight gain is good.

What is claimed is:

1. A method for combatting coccidiosis in poultry which comprises orally administering thereto an anticoccidial amount of a feed composition containing, based on the weight of said composition, from about 0.0125% to about 0.2% by weight of 6-chloropurine.

2. The method of claim 1 wherein the feed composition contains from about 0.006 to about 0.4% by weight of 6-chloropurine and from about 0.02 to about 0.04% by weight of a tetracycline antibiotic selected from the group consisting of oxytetracycline, tetracycline, 7-chlortetracycline, 6-methylene-5-oxytetracycline, 6-α-methyl-6-deoxytetracycline and 6-demethyl-6-deoxytetracycline.

3. The method of claim 2 wherein said tetracycline antibiotic is oxytetracycline.

4. The method of claim 2 wherein said tetracycline antibiotic is tetracycline.

5. The method of claim 2 wherein said tetracycline antibiotic is 7-chlortetracycline.

References Cited

UNITED STATES PATENTS

| | | | |
|---|---|---|---|
| 2,815,346 | 12/1957 | Hitchings et al. | 260—254 |
| 3,017,322 | 1/1962 | Ursprung | 167—53.1 |
| 3,304,227 | 2/1967 | Loveless | 167—53.1 |

OTHER REFERENCES

Poultry Science, vol. 39, White-Stevens, 1305–06; 1960.
Cancer Research, vol. 23, No. 11, 1762–1768; 1963, Booth et al.
Antibiotic, No. 3, p. 9, I. F. Grekh, 1959.

ALBERT T. MEYERS, Primary Examiner

H. M. ELLIS, Assistant Examiner

U.S. Cl. X.R.

424—253